UNITED STATES PATENT OFFICE.

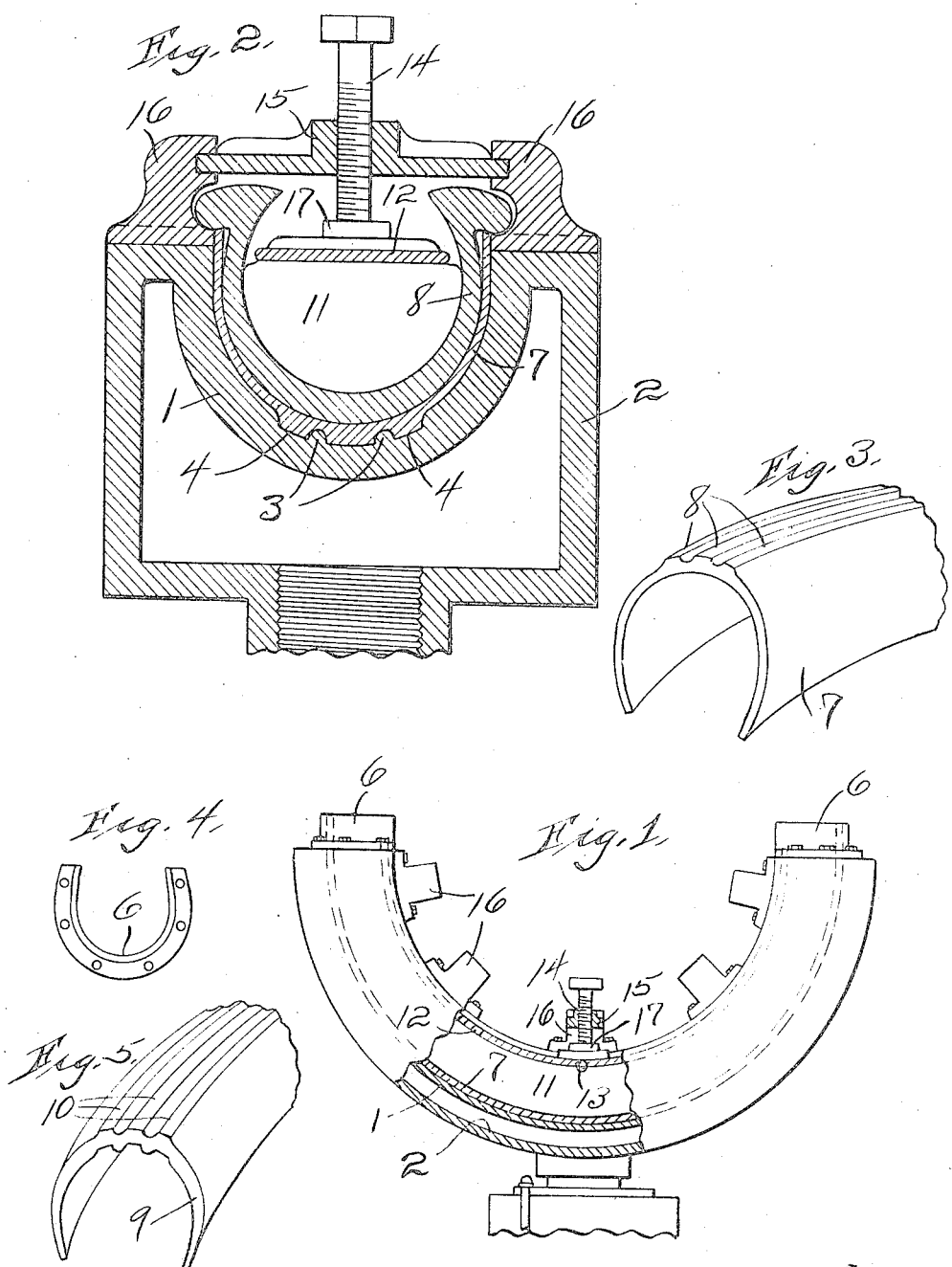

PHILIP P. BONGIO AND ELONZO STEPHENSON, OF FORT WORTH, TEXAS, ASSIGNORS TO TWO CURE RETREAD MOLD COMPANY, OF FORT WORTH, TEXAS, A CORPORATION OF ARIZONA.

APPARATUS FOR CURING TIRE-CASINGS.

1,323,573.        Specification of Letters Patent.        Patented Dec. 2, 1919.

Application filed May 5, 1919. Serial No. 294,949.

*To all whom it may concern:*

Be it known that we, PHILIP P. BONGIO and ELONZO STEPHENSON, both citizens of the United States of America, residing at Fort Worth, in the county of Tarrant and State of Texas, have invented certain new and useful Improvements in Apparatus for Curing Tire-Casings, of which the following is a specification.

Our invention relates to molding devices for curing tire casings and more particularly for rebuilding or retreading tire casings for pneumatic tires, and the object is to provide apparatus which is simple in construction and operation and by which one-half of a tire casing may be cured in one operation or one curing and then the other half cured in one operation. Another object is to provide apparatus by which either a ribbed tread or a smooth tread can be made. One object is to provide an aluminium inner shell by which casings with smooth treads may be made with the same apparatus. This invention is an improvement on the apparatus shown in our allowed application, Ser. No. 276,255, Feb. 11, 1919. Other objects and advantages will be fully explained in the following description and the invention will be more particularly pointed out in the claims.

Reference is had to the accompanying drawings which form a part of this application.

Figure 1 is a side elevation of the improved molding or curing device, partly in section. Fig. 2 is an enlarged vertical cross-section of the same. Fig. 3 is a broken section of the aluminium inner shell. Fig. 4 is a plan view of the aluminium tip for the protection of the tire casing adjacent to the part which is being cured. Fig. 5 is a section of an aluminium shell, showing a variation from the shell shown in Fig. 3.

Similar characters of reference are used to indicate the same parts throughout the several views.

The apparatus herein set forth includes a mold 1 which is semi-circular or slightly more than semi-circular. The object is to cure one-half of a casing at one time. A steam chamber 2 is provided so that the whole of the exterior part of the mold 2 will be exposed to hot steam or whatever heating element may be used in the chamber 2. The mold 1 has a groove 3 for the tread of the casing and this groove is ribbed with ribs 5 in the groove 3. The object is to make treads with grooves therein. In order to protect that part of the uncured casing which is adjacent to the half that is being cured, aluminium tips 6 are bolted to the ends of the mold 1. The aluminium tips have the effect of lessening the transmission of heat to the part of the casing that is not being treated. Without such tips, the rubber and other material which make up the tread to be cured will be swollen by the heat and will be distorted so that a nice finish cannot be secured.

If a smooth finish is wanted for the tread of the casing instead of a ribbed tread, the aluminium shell 7 is placed in the mold 1 and covers the entire interior of the mold 1. The exterior of the aluminium shell 7 has ribs 8 and grooves between the ribs conforming to the contour of the interior of the mold 1 so that the shell will be held securely in place. The aluminium shell 7 is made relatively thin and with a smooth interior finish so that the casing will have a smooth tread.

One of the advantages of the improved tread is that one-half of a casing may be cured at one treatment and then the other half cured, making only two operations for curing the entire casing or rebuilt tread of the casing.

An aluminium reducing shell 9 may be provided with ribs 10 on the interior thereof for making ribbed or grooved treads. See Fig. 5. The casing to be cured is held by a sand bag 11 and a pressing plate 12 is used on the sand bag 11. This pressing plate 12 must be in two parts hinged together by a hinge 13 so that the plate 12 can be inserted and taken out of the mold or shell. Screw bolts 14 are used to press the plate 12 down on the sand bag 11. The bolts 14 screw down through resistance plates 15 which are held down by the bracket members 16. The bolts bear on the shoes 17 which bear against the pressing plate 12.

What we claim is,—

1. An apparatus for curing tire casings comprising a curved curing form rectangular in cross-section and having a casing holder suspended within the space within said form and formed integral with said form, said form having a steam cavity for heating the form and said holder being semicircular for curing one-half of a casing in one operation, and a pressing plate semicircular in extent and hinged in the central part thereof mounted in said holder.

2. An apparatus for curing tire casings comprising a curved curing form semicircular in extent, a curved casing holder suspended therein and semicircular in extent, clamps attached to the sides of said form and having grooves in their inner faces, a sand bag for pressing tire casings against the interior of said casing holder, pressing plate in two parts hingedly connected together for pressing on said sand bag, resistance plates loosely mounted in said grooves, and screw bolts operating through said resistance plates for pressing on said pressing plate.

In testimony whereof, we set our hands, this 25th day of April, A. D. 1919.

PHILIP P. BONGIO.
ELONZO STEPHENSON.